(12) United States Patent
Nishio et al.

(10) Patent No.: US 9,920,729 B2
(45) Date of Patent: Mar. 20, 2018

(54) STARTING DEVICE FOR GAS INTERNAL COMBUSTION ENGINE

(71) Applicant: Mitsubishi Heavy Industries, Ltd., Tokyo (JP)

(72) Inventors: Hideki Nishio, Tokyo (JP); Michiyasu Ishida, Tokyo (JP); Hirotoshi Kitagawa, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 133 days.

(21) Appl. No.: 14/779,937

(22) PCT Filed: Jan. 28, 2014

(86) PCT No.: PCT/JP2014/051865
§ 371 (c)(1),
(2) Date: Sep. 24, 2015

(87) PCT Pub. No.: WO2014/156278
PCT Pub. Date: Oct. 2, 2014

(65) Prior Publication Data
US 2016/0053735 A1 Feb. 25, 2016

(30) Foreign Application Priority Data

Mar. 29, 2013 (JP) .................. 2013-073838

(51) Int. Cl.
*F02N 9/04* (2006.01)
*F02D 19/02* (2006.01)
(Continued)

(52) U.S. Cl.
CPC .............. *F02N 9/04* (2013.01); *F01N 9/00* (2013.01); *F02B 21/00* (2013.01); *F02D 19/02* (2013.01);
(Continued)

(58) Field of Classification Search
CPC ...... F02N 9/04; F02N 15/10; F02N 2200/022; F02D 19/02; F02D 41/0027; F02D 41/22; F02D 2041/225; Y02T 10/32
(Continued)

(56) References Cited

U.S. PATENT DOCUMENTS 2,742,758 A * 4/1956 Kelly ...................... F02C 7/277
60/39.827
3,307,349 A * 3/1967 Brelen ...................... F02N 9/04
123/179.31
(Continued)

FOREIGN PATENT DOCUMENTS

AT        506561 A1      10/2009
CN      101952578 A       1/2011
(Continued)

OTHER PUBLICATIONS

Notification Concerning Transmittal of International Preliminary Report on Patentability, App. No. PCT/JP2014/051865, Filed Jan. 28, 2014, 13 Pages.
(Continued)

*Primary Examiner* — Lindsay Low
*Assistant Examiner* — Anthony Taylor, Jr.
(74) *Attorney, Agent, or Firm* — Berkeley Law & Technology Group, LLP

(57) ABSTRACT

Embodiments may provide a starting device for a gas internal combustion engine whereby non-combusted gas accumulating in the gas internal combustion engine and an exhaust channel is discharged before ignition startup of the gas internal combustion engine and abnormal combustion of the gas internal combustion engine is prevented so as to improve safety, breakage prevention, durability and reliability. A starting device of a gas internal combustion engine 1 having an air starting device 30 includes a rotation-speed
(Continued)

detection unit of the gas internal combustion engine 1, a compressed-air introduction unit 5 for supplying compressed air to each of cylinders according to an order of an ignition timing of the gas internal combustion engine 1, a compressed-air supply unit 3 for supplying the compressed air to the compressed-air introduction unit 5, and a control device 2 including a cumulative rotation-speed setting device 21 whereby an operator can set a threshold value of a cumulative rotation speed optionally, the control device 2 being configured to halt supply of the compressed air by the compressed-air supply unit 3 if a set cumulative rotation speed is achieved on the basis of the rotation speed detected by the rotation-speed detection unit.

7 Claims, 9 Drawing Sheets

(51) Int. Cl.
| | | |
|---|---|---|
| *F02N 15/10* | (2006.01) | |
| *F02M 65/00* | (2006.01) | |
| *F01N 9/00* | (2006.01) | |
| *F02B 21/00* | (2006.01) | |
| *G01M 15/04* | (2006.01) | |
| *F02D 41/22* | (2006.01) | |
| *F02D 41/00* | (2006.01) | |
| *F01N 3/32* | (2006.01) | |
| *F02D 41/12* | (2006.01) | |

(52) U.S. Cl.
CPC .......... *F02M 65/006* (2013.01); *F02N 15/10* (2013.01); *G01M 15/046* (2013.01); *F01N 3/323* (2013.01); *F01N 2900/08* (2013.01); *F01N 2900/1404* (2013.01); *F01N 2900/1628* (2013.01); *F02D 19/025* (2013.01); *F02D 41/0027* (2013.01); *F02D 41/123* (2013.01); *F02D 41/22* (2013.01); *F02D 2041/225* (2013.01); *F02N 2200/022* (2013.01); *Y02T 10/32* (2013.01)

(58) Field of Classification Search
USPC ....................................................... 123/179.3
See application file for complete search history.

(56) References Cited

U.S. PATENT DOCUMENTS

| | | | | |
|---|---|---|---|---|
| 3,587,228 A | * | 6/1971 | Clements | F02N 9/04 123/179.31 |
| 4,324,212 A | * | 4/1982 | Samuel | F02N 9/04 123/179.31 |
| 4,747,270 A | * | 5/1988 | Klie | F02N 7/08 123/179.31 |
| 6,192,678 B1 | | 2/2001 | Tachibana | |
| 6,338,331 B1 | * | 1/2002 | Watanabe | F02D 33/02 123/179.18 |
| 8,661,834 B2 | * | 3/2014 | Tsuji | F02N 7/00 123/179.31 |
| 2007/0005222 A1 | * | 1/2007 | Lepley | F02N 9/04 701/113 |

FOREIGN PATENT DOCUMENTS

| | | | | |
|---|---|---|---|---|
| CN | 102803676 A | 11/2012 | | |
| DE | 102004035301 A1 | 2/2006 | | |
| DE | 102004042193 A1 | 3/2006 | | |
| GB | 1224900 A | 3/1971 | | |
| JP | H046738 U | 1/1992 | | |
| JP | H06257539 A | 9/1994 | | |
| JP | H07127530 A | 5/1995 | | |
| JP | 2009057873 A | 3/2009 | | |
| JP | 2009250150 A | 10/2009 | | |
| JP | 2012202376 A | 10/2012 | | |
| WO | 2007003693 A1 | 1/2007 | | |
| WO | WO 2007003693 A1 | * | 1/2007 | ............... F01L 1/08 |
| WO | 2009151387 A1 | 12/2009 | | |
| WO | 2012171049 A1 | 12/2012 | | |
| WO | 2014156278 A1 | 10/2014 | | |

OTHER PUBLICATIONS

International Search Report, App. No. PCT/JP2014/051865, Filed Jan. 28, 2014, dated Mar. 25, 2014, 12 Pages.
First Office Action, App. No. CN201480016461.6, dated Aug. 17, 2016, 9 Pages.
Decision to Grant a Patent, App. No. JP2013-073838, Drafting Date Oct. 12, 2016, dated Oct. 21, 2016, 6 Pages.
Notification Concerning Submission, Obtention or Transmittal of Priority Document, App. No. PCT/JP2014/051865, Filed Jan. 28, 2014, dated Mar. 19, 2014, 1 Page.
First Office Action, App. No. CN201480016461.6 dated Sep. 17, 2016, 9 Pages.
Extended European Search Report, App. No. 14773697.9, dated Oct. 20, 2017, 10 Pages.

* cited by examiner

FIG.6

○ : NO GAS LEAKAGE △ : GAS LEAKAGE CANNOT BE DETERMINED × : GAS LEAKAGE

| | CHECK OPERATION | 1st SAFETY SHUTOFF VALVE 81 | 2nd SAFETY SHUTOFF VALVE 82 | GAS-DIS-CHARGE VALVE 83 | 1st PRE-SSURE METER P1 | 2nd PRE-SSURE METER P2 | 3rd PRE-SSURE METER P3 | DETERMINATION ||| 
|---|---|---|---|---|---|---|---|---|---|---|
| | | | | | | | | 1st SAFETY SHUTOFF VALVE | 2nd SAFETY SHUTOFF VALVE | GAS-DIS-CHARGE VALVE |
| 1st OPERATION | GAS-DISCHARGE VALVE OPEN → CLOSE | CLOSED | CLOSED | CLOSED | ↑ (SAME) | ↑ | ↑ | ○ | △ | △ |
| | | " | " | " | ↗ (PRESSURE INCREASE) | ↑ | ↑ | × | ○ | △ |
| | | " | " | " | ↗ | ↑ | ↗ | × | × | △ |
| 2nd OPERATION | 1st SAFETY SHUTOFF VALVE CLOSE → OPEN | OPEN | CLOSED | CLOSED | ↗ | ↑ | ↑ | — | ○ | ○ |
| | | " | " | " | ↗ (PRESSURE DECREASE) | ↑ | ↗ | — | × | △ |
| | | " | " | " | ↗ | ↑ | ↑ | — | ○ | × |
| 3rd OPERATION | 1st SAFETY SHUTOFF VALVE OPEN → CLOSE | CLOSED | CLOSED | CLOSED | ↑ | ↑ | ↑ | ○ | ○ | ○ |
| | | " | " | " | ↗ | ↑ | ↑ | ○ | ○ | × |
| | | " | " | " | ↗ | ↗ | ↗ | ○ | × | ○ |

FIG.7

STARTUP TIME SCHEDULE

| | | STARTUP PRE-PARATION | STARTUP STARTING TIME T0 | 1st ELAPSED TIME T1 | 2nd ELAPSED TIME T2 | 3rd ELAPSED TIME T3 | 4th ELAPSED TIME T4 |
|---|---|---|---|---|---|---|---|
| 1 | GAS-LEAKAGE CHECK (STARTUP S/W) | OPTIONAL | | | | | |
| 2 | EXHAUST PURGE (STARTUP S/W) | FORCED OPERATION IF NOT PERFORMED DURING PREVIOUS SHUTDOWN | | | | | |
| 3 | GAS-DISCHARGE VALVE BETWEEN SAFETY SHUTOFF VALVES | | CLOSED | | | | |
| 4 | SLOW-AIR-TURNING ELECTROMAGNETIC VALVE | | OPEN | | CLOSED (1sec) | | |
| 5 | AIR STARTING ELECTROMAGNETIC VALVE (STARTING ELECTROMAGNETIC VALVE) | | | OPEN | | | CLOSED (ROTATION SPEED $N \geqq$ 2nd SET ROTATION SPEED $N_0$) |
| 6 | OPERATION COMMAND TO IGNITION DEVICE | | ISSUANCE (START OPERATION) | | | | |
| 7 | SAFETY SHUTOFF VALVE (FUEL-GAS SUPPLY) | | | | | OPEN (ROTATION SPEED $N \geqq$ 1st SET ROTATION SPEED $N_s$) | |

→ TIME COURSE T

STARTING DEVICE FOR GAS INTERNAL COMBUSTION ENGINE

TECHNICAL FIELD

The present invention relates to a starting device for a gas internal combustion engine with a slow air turning device.

BACKGROUND

In a precombustion-chamber type lean premixed gas internal combustion engine (hereinafter, referred to in short as a gas engine), there is a starting method adopting slow air turning, in which compressed air (not containing fuel gas) is introduced into cylinders to rotate a gas engine before starting an air starting device, for the purpose of checking the inside of the cylinders, securing lubrication of the sliding surfaces of the cylinders and pistons that slide inside the cylinders, and reducing the preparation work before starting.

In the slow air turning, if a starting command (manual) of an air starting device is issued, a starting valve for slow air turning firstly opens, and then after predetermined rotation, the air starting device starts operating. Subsequently, if the gas engine reaches a predetermined rotation speed, fuel gas is supplied to the gas engine, and operation of the gas engine by ignition combustion of the fuel gas is started.

However, to secure supply and safety of the fuel gas, a variety of devices, valves, and the like are provided for the gas engine, from which unpredictable leakage of the fuel gas may occur. For example, fuel gas having leaked from the above devices, valves, and the like may flow to and accumulate in each of the gas engine, an exhaust channel, and the like. If the gas engine is switched to ignition startup by fuel gas under such a condition, the accumulating combustion gas undergoes abnormal combustion and damages the gas engine, the exhaust channel, and the like.

Patent Document (JP2012-202376A) 1 discloses performing a dry-air injecting block of injecting dry air into an intake channel, and a cranking step of igniting and combusting air-fuel mixture with a spark plug and starting rotation of an output shaft of a gas engine after the dry-air injecting block. As a result, if the gas engine is started, dry air is injected into an air-supply channel before operation of the spark plug, which reduces an absolute humidity inside the intake channel. Thus, if the spark plug operates for the first time after startup, air with low humidity is supplied into a combustion chamber. Accordingly, the surface of electrodes of the spark plug is less likely to get moist, which makes it possible to maintain good insulation resistance between the electrodes, so that the spark plug generates sparks normally and misfire is prevented.

Further, in Patent Document 1, pre-purge, which is to discharge remaining gas in a combustion chamber to the outside via the exhaust channel, is performed. At this time, the first injector, the second injector, and the spark plug are maintained to be shut down. An injection switch valve closes and a starter inlet valve opens. As a result, a starter motor starts to operate and a flywheel is driven to rotate together with an output shaft. Then, a piston reciprocates without the air-fuel mixture undergoing ignition combustion. In this way, an intake valve and an exhaust valve are driven by the output shaft, performing opening/closing motion in accordance with the stroke of the pistons. As the reciprocating motion of the pistons is repeated, the remaining gas in the combustion chamber is forced out to the exhaust channel. Instead, dry air is supplied to a main combustion chamber and a precombustion chamber from the intake channel. In this way, it is possible to ventilate the inside of the main combustion chamber and the precombustion chamber with dry air, which makes it possible to prevent non-combusted gas or soot from being incorporated into air-fuel mixture if the air-fuel mixture undergoes ignition combustion for the first time upon startup. The reciprocating motion of the piston is repeated a certain number of times that is sufficiently large to discharge gas from the main combustion chamber and the precombustion chamber and that is sufficiently small so that air in the supply-air channel does not completely pass through the main combustion chamber.

SUMMARY

According to Patent Document 1, the second dry-air injecting block is performed after a pre-purge block of reciprocating the piston without performing ignition combustion with the air-fuel mixture to discharge the remaining gas in the main combustion chamber to the outside via the exhaust channel, and before the cranking block. In this way, dry air is injected again into the supply-air channel. Thus, even though the pre-purge block is performed, if the spark plug operates for the first time upon startup, it is possible to prevent air with high humidity from being supplied into the combustion chamber. In the pre-purge block, in order to discharge the remaining gas in the combustion chamber to the exhaust channel, the engine cycle is repeated a certain number of times that is sufficiently large to discharge gas from the main combustion chamber and the precombustion chamber and that is sufficiently small so that air in the supply-air channel does not completely pass through the main combustion chamber. Thus, while it is possible to discharge gas from the main combustion chamber and the precombustion chamber, it is neither possible to discharge the gas accumulating in the exhaust channel completely nor to prevent abnormal combustion in the exhaust channel during fuel-gas ignition operation of the gas engine. Further, the second dry-air injecting block is to dry the inside of the supply-air channel to prevent the spark plug of the combustion chamber from getting moist. Thus, non-combusted gas is accumulating in the gas engine and the exhaust channel, and thus it may not be possible to prevent abnormal combustion if startup of the gas engine is started by the spark plug.

BRIEF DESCRIPTION OF DRAWINGS

FIG. 6 is a diagram of gas leakage determination performed by the fuel-gas leakage detection unit according to an embodiment.

FIG. 7 is an operation-time chart of each device upon startup of the gas engine according to an embodiment.

DETAILED DESCRIPTION

Embodiments may at least partially solve the above issues and may provide a starting device for a gas engine whereby non-combusted gas accumulating in the gas engine and an exhaust channel is discharged before ignition startup of the gas engine and abnormal combustion during ignition startup is prevented so as to improve safety, breakage prevention, durability and reliability.

In order to achieve the above-described effect, embodiments may provide a starting device of a gas internal combustion engine having an air starting device, for performing slow air turning in which compressed air presses pistons to rotate the gas internal combustion engine at a low speed before startup in order to check an inside of each of cylinders of the gas internal combustion engine and to secure lubrication between the cylinders and the pistons. The starting device may comprise, at least in an embodiment: a rotation-speed detection unit configured to detect a rotation speed of the gas internal combustion engine; a compressed-air introduction unit configured to supply the compressed air to each of the cylinders according to an order of an ignition timing of the gas internal combustion engine; a compressed-air supply unit configured to supply the compressed air to the compressed-air introduction unit; and a control device including a cumulative rotation-speed setting device capable of setting a threshold value of a cumulative rotation speed optionally, the control device being configured to halt supply of the compressed air by the compressed-air supply unit if the gas internal combustion engine reaches a set cumulative rotation speed on the basis of the rotation speed detected by the rotation-speed detection unit.

According to the above-described embodiment, the compressed air used in the slow air turning may flow to the exhaust channel by performing the slow air turning. On the exhaust side of the gas engine, an exhaust-gas purification device such as a denitration device, a PM filter, and an oxidation catalyst is disposed depending on the set specification of the gas engine. The capacity of the exhaust path may vary depending on the set specification of the exhaust-gas purification device. Thus, in a case where the compressed air having performed slow air turning is used to discharge gas accumulating in the exhaust channel, it is necessary to switch to a control device that has a different set cumulative rotation speed each time. In view of this, slow air turning enables facilitated operation for changing a cumulative rotation speed at which the compressed air is sent into the exhaust channel to a cumulative rotation speed that conforms to the capacity of the exhaust channel, which makes it possible to enable the common use of the control device, prevent abnormal combustion in the exhaust path, and reduce cost for enabling the common use of a component (control device).

Figure 2A:
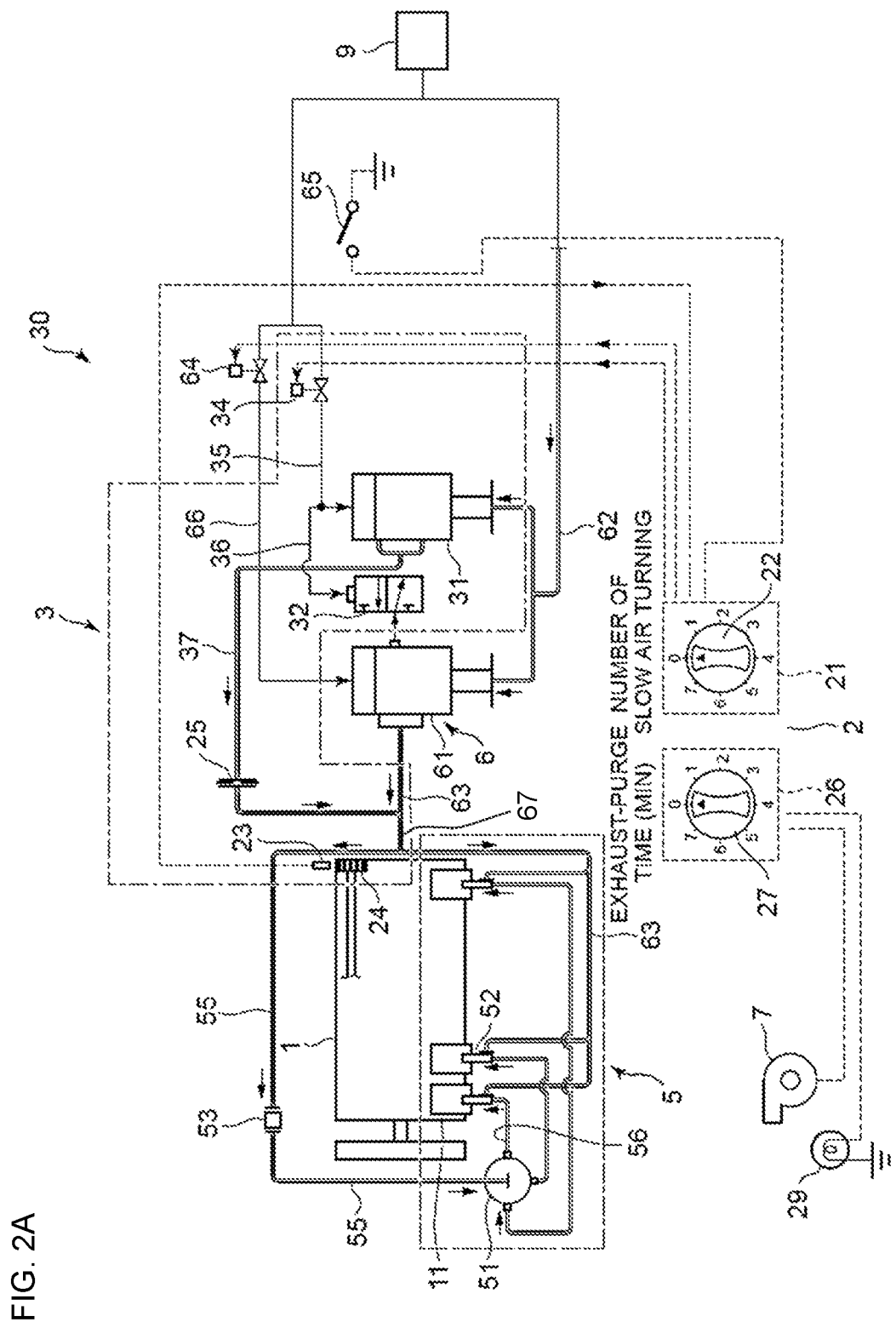
FIG. 2 is a schematic configuration diagram of an air starting device of a gas engine according to an embodiment.

Further, in an embodiment, such as in accordance with FIG. 2A, the starting device may further include shared pipe 67 used as a compressed-air pipe on a downstream side of a main starting valve for operating the air starting device and as a compressed-air pipe on a downstream side of a slow-air-turning main starting valve of the compressed-air supply unit for operating the slow air turning.

According to the above-described embodiment, with the shared pipe used as a compressed-air pipe on a downstream side of a main starting valve and as a compressed-air pipe on a downstream side of a slow-air-turning main starting valve, it is possible to simplify the overall structure of the device and thus to simplify the cost and structure for pipe arrangement, which makes it possible to improve the reliability of the precombustion-chamber type lean premixed gas internal combustion engine as a whole.

Further, in an embodiment, the starting device may further include an orifice disposed in an air pipe between the compressed-air supply unit and the in-cylinder introduction unit, the orifice being configured to restrict a flow rate of the compressed air introduced into the cylinders.

In one or more embodiments, the same component may be used as an air-pressure valve of the air starting device and an air-pressure valve of the compressed-air supply unit, and the orifice is disposed on the upstream side of the in-cylinder introduction unit, so that the amount of compressed air introduced into the cylinders is restricted, which makes it possible to rotate the gas engine at a low rotation speed, use the air-pressure valve in common, and restrict an increase in the cost of the device as a whole.

Further, in an embodiment, the starting device may further include a switch valve disposed on the main starting valve and configured to receive a signal from a compressed-air circuit which is operating the slow-air-turning main starting valve and prevent the compressed air from being discharged to atmosphere from the main starting valve while the slow-air-turning main starting valve is in operation, the compressed air being supplied by the compressed-air supply unit to the compressed-air introduction unit from the main starting valve.

According to the above-described embodiment, the main starting valve comprises a structure such that the compressed air in a starting circuit may be discharged to the atmosphere if operation of the main starting valve is halted, because compressed air remaining in the circuit for the compressed air of the compressed-air introduction unit generates internal resistance of the gas engine during fuel-gas operation. Accordingly, while the slow air turning is performed, the compressed air in the operation circuit of the slow air turning may be prevented from being discharged to the atmosphere from the main working valve, so as to enable operation of the slow air turning. After the gas engine starts operation by fuel, the operation of the main working valve stops. The compressed air in the operation circuit of the slow air turning is discharged to the atmosphere from the main working valve to prevent the compressed air from becoming internal resistance of the gas engine.

Further, in an embodiment, the control device may be configured to operate exhaust purge for a predetermined period at least either before execution of the slow air turning or after shutdown of the gas engine.

According to the above embodiment, it is possible to prevent such an event that gas concentration in the exhaust path rises if non-combusted gas is remaining in the exhaust path due to an ignition failure or the like upon startup of the engine, and the remaining gas undergoes abnormal combustion in the exhaust path after the next ignition startup of the engine. Thus, it is possible to improve the reliability in starting the gas engine.

Further, in an embodiment, the control device may operate a gas-leakage checking device for checking leakage of fuel gas before operation of the slow air turning.

Further, in an embodiment, the gas-leakage checking device may include: a first safety shutoff valve disposed in a fuel-gas supply pipe for supplying the fuel gas to a combustion chamber of the gas internal combustion engine; a second safety shutoff valve disposed on a downstream side of the first safety shutoff valve; a gas-leakage checking pipe branched from the fuel-gas supply pipe between the first safety shutoff valve and the second safety shutoff valve; a gas-discharge valve disposed on a distal end portion of the gas-leakage checking pipe and configured to discharge the fuel gas between the first safety shutoff valve and the second safety shutoff valve; a first pressure meter disposed in the gas-leakage checking pipe on an upstream side of the gas-discharge valve and configured to detect a fuel-gas pressure in the gas-leakage checking pipe; a main-chamber supply pipe which is one of branched pipes branched at a downstream side of the second safety shutoff valve and which is configured to supply the fuel gas to a main chamber of the combustion chamber via the fuel-gas supply pipe; a precombustion-chamber supply pipe which is other one of the branched pipes and which is configured to supply the fuel gas to a precombustion chamber of the combustion chamber; a second pressure meter disposed in the main-chamber supply pipe and configured to detect a pressure of the fuel gas in the main-chamber supply pipe; and a third pressure meter disposed in the precombustion-chamber supply pipe and configured to detect a pressure of the fuel gas in the precombustion-chamber supply pipe.

According to the above-described embodiment, a pressure between the first and second safety shutoff valves is detected to check a trouble of the safety shutoff valves. Further, leakage of the second safety shutoff valve is checked at the downstream side of the second safety shutoff valve by the second pressure meter and the third pressure meter to predict leakage of fuel gas in response to temporal deformation of the valve or the like in response to an external acting force (e.g. vibration due to an earthquake), the fuel gas then flowing into the exhaust channel. Then, the non-combusted gas in the corresponding section is discharged to prevent the remaining gas from undergoing abnormal combustion in the exhaust channel, which makes it possible to improve the reliability in starting the gas engine.

According to the one or more of the above-described embodiments, it is possible to provide a starting device for a gas internal combustion engine whereby non-combusted gas accumulating in the gas engine and an exhaust channel is discharged before ignition startup of the gas engine and abnormal combustion during ignition startup is prevented so as to improve safety, breakage prevention, durability and reliability.

Embodiments will now be described in detail with reference to the accompanying drawings. It is intended, however, that unless particularly specified, dimensions, materials, shapes, relative positions and the like of components described in the embodiments shall be interpreted as illustrative only and not limitative of the scope of the claimed subject matter.

Figure 1:
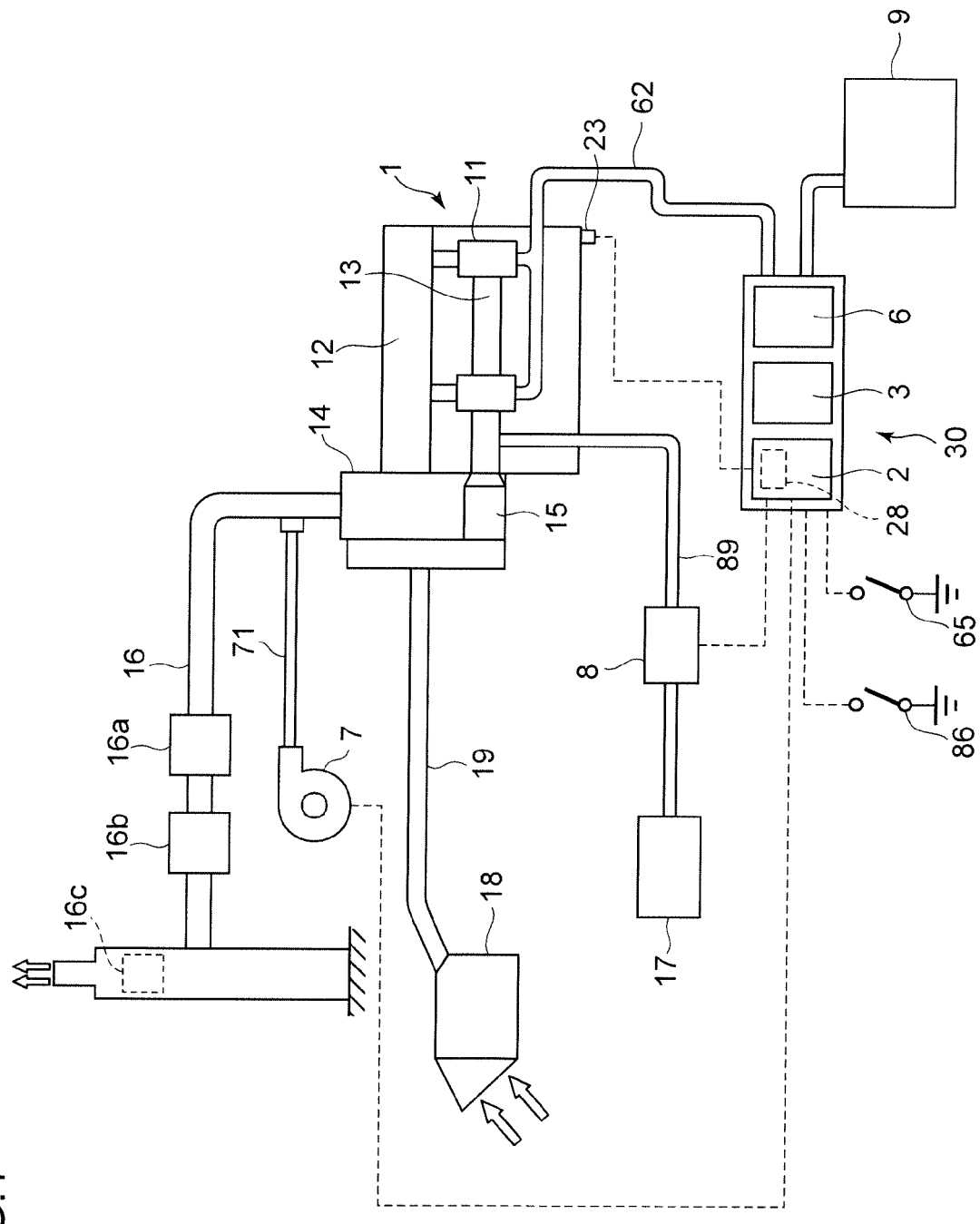
FIG. 1 is a schematic overall configuration diagram of a gas engine according to an embodiment.

With reference to FIG. 1, the overall configuration of a gas internal combustion engine (hereinafter, referred to in short as a gas engine) according to an embodiment is described. The gas engine 1 includes: an air starting device 30 coupled to the gas engine 1 via the first pipe 62; a compressed-air tank 9 for supplying compressed air to the air starting device 30; a turbocharger 14 mounted to an exhaust-air collecting pipe 12 of the gas engine 1; an exhaust channel 16 for discharging to the atmosphere exhaust gas having driven an exhaust turbine (not illustrated) of the turbocharger 14; an air cleaner 18 for removing dust contained in air that is to be supplied to the gas engine 1; an air cooler 15 coupled coaxially to the exhaust turbine for compressing intake air from the air cleaner 18 and cooling heated supply air; an air supply pipe 19 to permit airflow from air cleaner 18 to air cooler 15; an exhaust-purge fan 7 for exhaust purge coupled to the exhaust channel 16 at the downstream side of the turbocharger 14 in the flow direction of exhaust gas via a blast pipe 71, for blowing air into the exhaust channel 16; a fuel-gas supply device 17 for supplying fuel gas to the gas engine 1; and a gas-leakage checking device 8 disposed in a fuel-gas supply pipe 89 disposed between the fuel-gas supply device 17 and the supply pipe 13, for checking gas leakage of safety shutoff valves. In the exhaust channel 16, an oxidation catalyst 16b for oxidizing and detoxifying carbon monoxide (CO) and hydrocarbon (HC) contained in the exhaust gas, a denitration device 16c for decomposing nitrogen oxide (NOx) contained in the exhaust gas into harmless nitrogen and water by injecting ammonia (NH3) and using a catalyst so as to obtain clean exhaust gas, a PM filter 16a for removing suspended particulate matters contained in the exhaust gas (PM: particulate matter), and the like are disposed in accordance with the required specification of the device. Thus, depending on the required specification of the exhaust-gas purification device to be mounted, the channel capacity of the exhaust channel 16 varies.

Further, 23 is a rotation-speed sensor for detecting the rotation speed of slow-air turning upon startup of the gas engine.

Figure 2B:
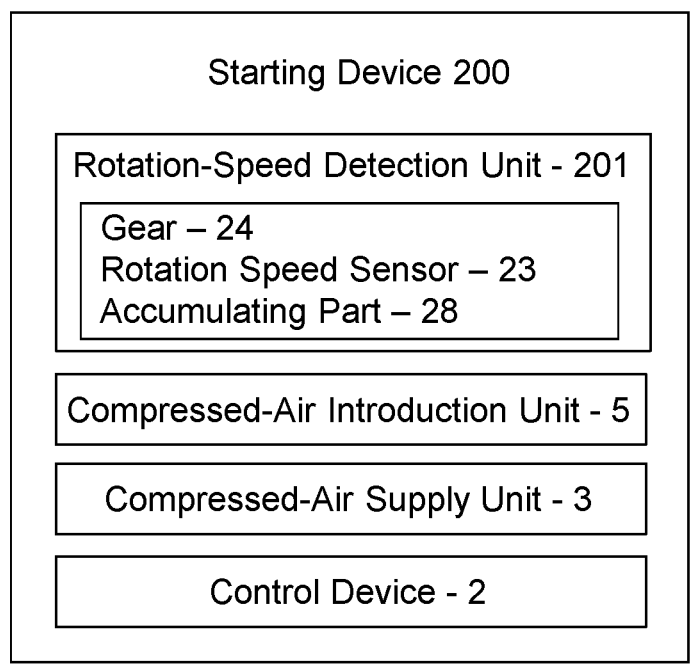

FIG. 2 is a schematic configuration diagram of the air starting device 30. The air starting device 30 includes a control device 2 for controlling operation of the air starting device 30, a main air-starting unit 6 which increases the gas engine 1 to a rotation speed for startup of fuel-gas ignition operation, and a compressed-air supply unit 3 for performing slow-air turning for checking the inside of each cylinder of the gas engine 1 and securing lubrication between cylinders and pistons in the cylinders before operation of the main air-starting unit 6. In the present embodiment, the control device 2 comprises a comprehensive control device which controls the air starting device 30, the exhaust purge fan 7 for exhaust purge, and the gas-leakage checking device 8. Further, the control device 2 includes a time-setting device 26 which can easily change the operation time of exhaust purge in accordance with the exhaust-channel capacity upon execution of the exhaust purge. The time-setting device 26 includes a time (minute) inputting switch 27 of a dial type for setting the operation time of exhaust purge.

The main air starting unit 6 includes a main starting valve 61, an air starting switch 65 (hereinafter, switch is referred to in short as S/W) that is manually manipulated to operate the main starting valve 61 via the control device 2, a starting electromagnetic valve 64 that opens the main starting valve 61 via the first pipe 62 with compressed air from the compressed-air tank 9 if the air starting S/W 65 is switched on, and a compressed-air introduction unit 5 that introduces compressed air into each cylinder according to the order of ignition timing of the gas engine 1, the compressed air being supplied by opening the main starting valve 61. The opened main starting valve 61 sends the compressed air for operation for air startup toward the compressed-air introduction unit 5 via the first pipe 62.

The compressed-air introduction unit 5 includes: a starting-pipe control valve 51 which distributes pilot air to each cylinder of the gas engine 1 according to the order of ignition timing of the gas engine 1; a starting valve 52 that is mounted to a cylinder head 11 of the gas engine 1 and opened by pilot air from the starting-pipe control valve 51; the fourth pilot air pipe 56 coupling the starting-pipe control valve 51 and the starting valve 52; the third pilot air pipe 55 that is branched from the second pipe 63 and introduces pilot air to the starting-pipe control valve 51; and an interlock valve 53 disposed in the third pilot air pipe 55 for safety check that a fitting-and-disengaging device of an engine turning device is removed between the main starting valve 61 and the starting valve 52. A slow-air-turning main starting valve 31 has a structure such that the compressed air from the third pipe 37 is not discharged to the atmosphere from the slow-air-turning main starting valve 31 during operation of the main starting valve 61 while operation of the slow-air-turning main starting valve 31 is halted.

Accordingly, if the air starting S/W 65 is switched on, the starting electromagnetic valve 64 opens. The main starting valve 61 is opened by the compressed air from the starting electromagnetic valve 64, which travels through air pipe 66. The compressed air passes through the first pipe 62, the main starting valve 61, the second pipe 63, the third pilot air pipe 55, and the interlock valve 53 in this order, thereby reaching the starting-pipe control valve 51 in the end. The starting pipe control valve 51 sends pilot air to the starting valve 52 mounted to a cylinder that has reached the ignition timing of the time of the previous halt of the gas engine 1. The starting valve 52 opens, and the compressed air from the second pipe 63 is introduced into the cylinder from the starting valve 52. The piston in the cylinder is pressed by the compressed air, and the gas engine 1 starts rotation. If the gas engine 1 reaches a predetermined rotation speed, the gas engine 1 starts operation by fuel-gas ignition.

If the gas engine 1 starts operating by fuel-gas ignition, the control device 2 closes the starting electromagnetic valve 64, as well as halting supply of the compressed air to the main starting valve 61 and closing the main starting valve 61. If the main starting valve 61 closes, the compressed air remaining in the second pipe 63 and the third pilot air pipe 55 is discharged to the atmosphere from the main starting valve 61 via a switch valve 32 that is normally open. The main starting valve 61 has a structure such that the compressed air in the air starting circuit is discharged to the atmosphere if operation of the main starting valve 61 is halted, because compressed air remaining in the compressed air circuit of the compressed-air introduction unit 5 generates internal resistance of the gas engine 1 during operation by fuel-gas ignition.

Before the main air starting unit 6 is started, slow air turning is performed to check the inside of each cylinder of the gas engine 1, lubricate the piston ring and the cylinder liner inside the cylinder, and check safety around the combustion chamber. In addition to the above reasons, in an embodiment, if non-combusted fuel gas is remaining in the gas engine 1 and the exhaust channel 16 disposed on the downstream side of the gas engine 1 due to occurrence of an unpredictable event, for example, such fuel gas may be discharged in order to prevent occurrence of abnormal combustion due to the remaining fuel gas during fuel-gas ignition operation of the gas engine 1.

With reference to FIG. 2, the configuration of the compressed-air supply unit 3 for performing slow air turning will be described. The compressed-air supply unit 3 includes: the slow-air-turning main starting valve 31; a slow-air-turning electromagnetic valve 34 that opens the slow-air-turning main starting valve 31 with pilot air compressed and transmitted from the compressed-air tank 9 via the second pilot air pipe 35; the compressed-air introduction unit 5 that introduces the compressed air supplied as the slow-air-turning main starting valve 31 opens into each cylinder according to the order of ignition timing of the gas engine 1; an orifice 25 for pressure reduction disposed in the third pipe 37 connecting the second pipe 63 and the slow-air-turning main starting valve 31; a switch valve 32 mounted to the main starting valve 61 to prevent the compressed air from being discharged to the atmosphere from the halted main starting valve 61 during operation of the slow-air-turning main starting valve 31; a rotation-speed detection unit which detects the slow-air-turning rotation speed of the gas engine 1; and a cumulative rotation-speed setting device 21 which is capable of closing the slow-air-turning electromagnetic valve 34 and varying a set threshold of the rotation speed optionally if the rotation speed detected by the rotation-speed detection unit reaches the set threshold.

The switch valve 32 is mounted to the downstream side of the main starting valve 61, and opened by pilot air introduced by the fifth pilot air pipe 36 branched from the second pilot air pipe 35, so that the compressed air is not discharged to the atmosphere via the main starting valve 61 during operation of slow air turning. Accordingly, while the slow air turning is performed, the compressed air in the operation circuit of the slow air turning is prevented from being discharged to the atmosphere from the main starting valve 61, which makes it possible to perform operation of the slow air turning. If the cumulative rotation speed of slow air turning reaches a threshold, the main starting valve 61 starts operation to increase the rotation speed to a rotation speed (rpm) at which the gas engine 1 can be operated by fuel-gas ignition. Once the gas engine 1 starts to operate by fuel-gas ignition, the operation of the main starting valve 61 stops, and thereby the compressed air in the operation circuit of the slow air turning is discharged to the atmosphere from the main starting valve 61 to prevent the compressed air from becoming internal resistance of the gas engine 1.

The rotation-speed detection unit includes a gear 24 for driving a cam shaft mounted to a cam shaft of the gas engine 1, the rotation-speed sensor 23 disposed adjacently to the gear 24, and an accumulating part 28 which accumulates pulse signals detected by the rotation-speed sensor 23. The cumulative rotation-speed setting device 21 includes a rotation-speed inputting switch 22 of a dial type for setting a cumulative rotation speed (threshold) in accordance with the capacity of the exhaust channel 16. While the cumulative rotation speed is detected by detecting the rotation speed of the cam shaft in the present embodiment, the rotation speed of the crank shaft of the gas engine 1 may be detected. Further, the orifice 25 is provided to reduce a pressure (flow rate) of the compressed air introduced into the cylinders to reduce a pressing force on the pistons, and to slow down the rotation speed of the gas engine 1. Further, since the compressed-air introduction unit 5 that introduces the compressed air into the cylinders is used in common by the main air starting unit 6 with similar operation, the compressed-air introduction unit 5 is not described in detail.

Performing slow air turning makes it possible to eliminate remaining gas in the gas engine 1 and the exhaust channel 16. However, various exhaust-gas purification devices are disposed in the exhaust channel 16 in view of prevention of environmental pollution. As described above, the exhaust-gas purification devices include, for instance, the oxidation catalyst 16b, the denitration device 16c, and the PM filter (PM; particulate matter) 16a for purifying exhaust gas, arranged in accordance with the required specification of the exhaust channel device. The specification of the exhaust-gas purification devices is varied depending on the characteristics of a usage area, demand of the client, or the like, and thus the capacity inside the exhaust channel 16 also varies. In view of this, varying a set value of the cumulative rotation speed of slow air turning in accordance with the capacity inside the exhaust channel 16 makes it possible to reduce the cost by sharing the control device 2, as well as discharging air (which may contain fuel gas) in the gas engine 1 and the exhaust channel 16.

Figure 3:
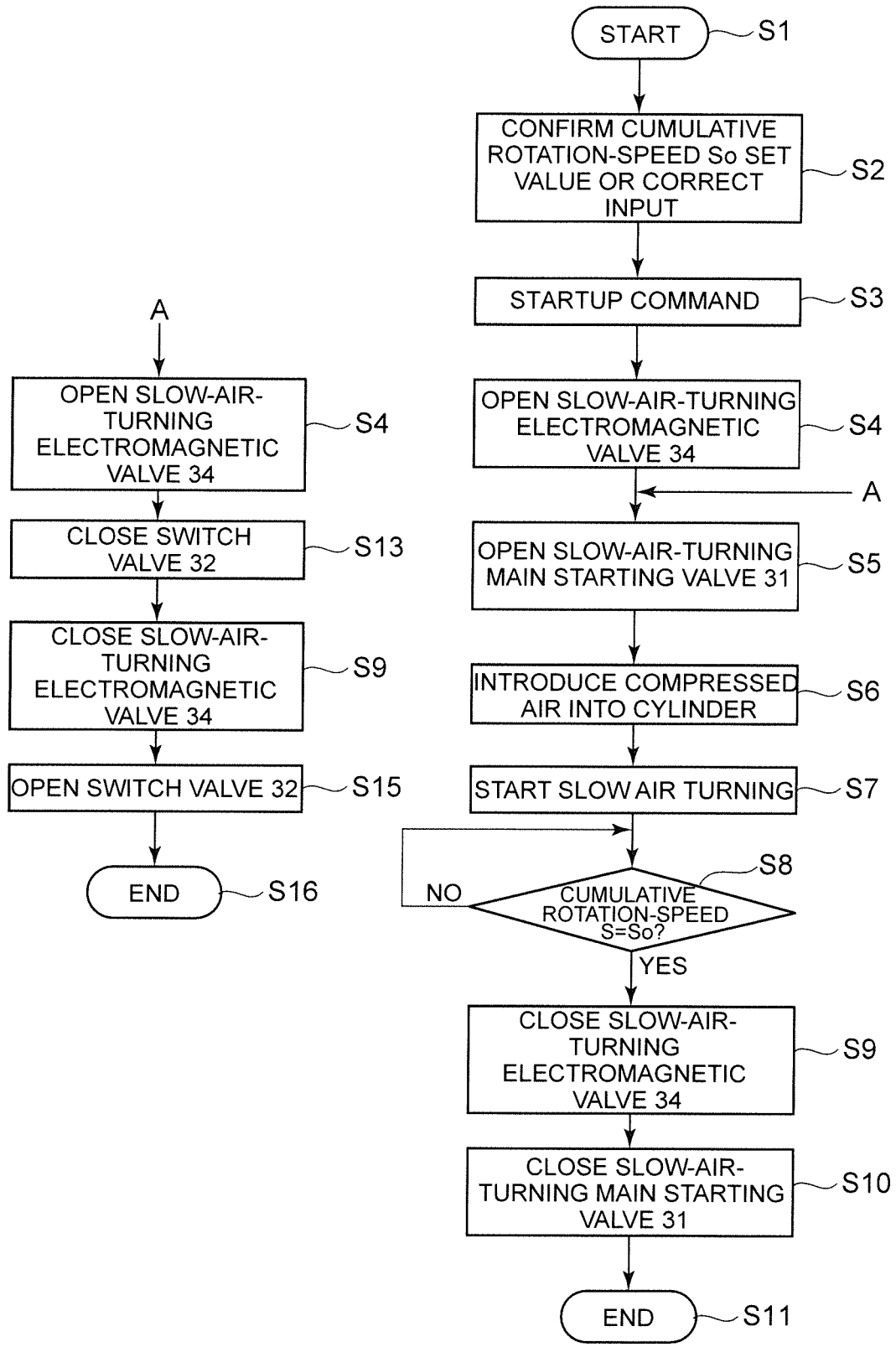
FIG. 3 is an operation flowchart of slow air turning according to an embodiment.

With reference to FIG. 3, the operation flow of the slow air turning will be described. The flow starts from block S1. In block S2, whether the cumulative rotation speed (threshold) So based on an operation condition of the gas engine 1 is achieved, or the cumulative rotation speed So satisfying the condition, is inputted by the rotation-speed input S/W 22. In block S3, a starting command is issued. That is, the starting switch 65 is switched on. In block S4, the slow-air-turning electromagnetic valve 34 opens in response to a signal from the control device 2, and pilot air is introduced into the slow-air-turning main starting valve 31 via the second pilot air pipe 35.

In block S5, the slow-air-turning main starting valve 31 starts operation (opens), so that the compressed air flows out into the third pipe 37 via the first pipe 62. The orifice 25 is disposed in the third pipe 37. In block S6, the compressed air is introduced into the cylinders of the gas engine 1 by the compressed-air introduction unit 5. In block S7, the compressed air introduced into the compressed-air introduction unit 5 has its pressure reduced by the orifice 25, and the pistons in the cylinders perform slow air turning at a low speed. Since the pistons slide at a low speed, the sliding speed (rotation speed of the gas engine) is low. Thus, it possible to prevent breakage or the like of the engine even if coolant water or lubricant oil, for instance, is intruding into the cylinders. In this way, it is possible to check the inside of the cylinders and secure lubrication between the cylinders and the pistons sliding inside the cylinders.

In block S8, in response to a signal from the rotation-speed sensor 23, the control device 2 determines a cumulative rotation speed S of the gas engine 1. NO is selected and a standby state is continued until the cumulative rotation speed S reaches the set rotation speed (threshold) So. If "cumulative rotation speed S=set rotation speed So" is satisfied, YES is selected and the process advances to block S9. At this time, it is estimated that air in the gas engine 1 and the exhaust channel 16, which is air that is suspected to be containing fuel gas, has been successfully discharged. In block S9, the control device 2 closes the slow-air-turning electromagnetic valve 34 to shut off the pilot compressed air having been sent to the slow-air-turning main starting valve 31. In block S10, the slow-air-turning main starting valve 31 is closed. In block S11, the slow air turning is completed.

On the other hand, if the slow-air-turning electromagnetic valve 34 is opened in block S4, a subroutine A operates concurrently. The pilot compressed air is introduced into the switch valve 32 via the fifth pilot air pipe 36 branched from the second pilot air pipe 35. In block S13, the switch valve 32 mounted to the main starting valve 61 is closed, so that the compressed air flowing through the second pipe 63 and the third pipe 37 during operation of the slow air turning is not discharged to the atmosphere from the halted main starting valve 61. Further, in block S9, if the slow-air-turning electromagnetic valve 34 is closed, the pilot compressed air is shut off. In block S15, the switch valve 32 is opened, and the compressed air in the second pipe 63 is discharged to the atmosphere from the main starting valve 61 and the switch valve 32 in this order.

As described above, the control device 2 is configured to be capable of switching the threshold of the cumulative rotation speed for performing slow air turning easily, on the basis of the installation specification of the exhaust-gas purification devices disposed in the exhaust channel 16. Accordingly, it is possible to reduce the occurrence of abnormal combustion in the gas engine 1 and the exhaust channel 16 by changing the cumulative rotation speed at which the compressed air used for slow air turning may flow in the gas engine 1 and the exhaust channel 16 easily to the cumulative rotation speed conforming to the capacity of the exhaust channel 16. Further, since the cumulative rotation speed is variable, it is possible to enable the common use of a control device, and to prevent abnormal combustion in the exhaust channel and to reduce cost for enabling the common use of a component (control device).

Further, the present air starting device is configured to perform exhaust purge to discharge remaining fuel gas in the exhaust channel securely before the slow air turning, separately from the slow air turning. The exhaust purge includes an exhaust purge fan 7, a blast pipe 71 connected to the exhaust purge fan 7 at one end and to the exhaust channel 16 at the downstream side of the turbocharger 14 with respect to the exhaust turbine at the other end, a time-setting device 26 provided for the control device 2, and a pilot lamp 29 which is an informing device for informing an operator of completion of exhaust purge, from a signal from the control device 2. The time-setting device 26 includes a time (minute) inputting switch 27 of a dial type for setting the operation time of exhaust purge. The set time of the time setting device 26 can be set to be long if the capacity of the exhaust channel is large, and to be short if the capacity is small. Further, while the pilot lamp 29 is used as an informing device in the present embodiment, a buzzer may be used instead, or both of a buzzer and the pilot lamp 29 may be used together. In this case, the operator is informed that the exhaust purge has been completed and that the next operation may be performed, which makes it possible to remind the operator securely not to perform the next operation during the exhaust purge, and to perform safe starting operation for the gas engine.

Figure 4:
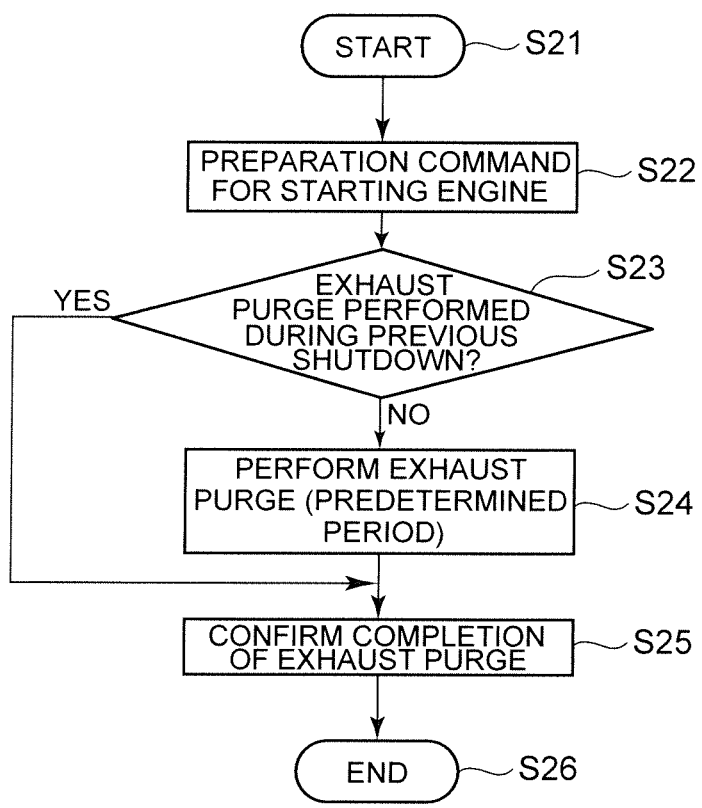
FIG. 4 is an operation flowchart of exhaust purge according to an embodiment.

With reference to FIG. 4, the control for performing exhaust purge will be described. The exhaust purge starts in block S21, and then in block S22, the operator switches on a starting switch 65, which is a starting preparation command of an engine, in order to start the gas engine 1. In block S23, the control device 2 confirms whether exhaust purge has been performed on the exhaust channel 16 during the previous shutdown of the gas engine 1. If exhaust purge has not been performed, NO is selected and the process advances to block S24. In block S24, the control device 2 operates the exhaust purge fan 7 for a predetermined period to discharge air (that may contain fuel gas) in the exhaust channel 16 with ambient air. The operation time is determined in accordance with the capacity of the exhaust channel that varies depending on the arrangement specification of the various exhaust gas purification devices disposed in the exhaust channel 16.

After the exhaust purge is performed for a predetermined period, the process advances to block S25, and the control device 2 informs (confirms) completion of the exhaust purge using the pilot lamp 29, which is an informing device. The operator can confirm that the exhaust purge is completed and that the next operation can be performed. The control device 2 is configured such that air starting, which is the next block, cannot be performed unless execution of the exhaust purge is confirmed. In block S23, if exhaust purge has been performed on the exhaust channel 16 during the previous shutdown of the gas engine 1, YES is selected and the process advances to block S25. Block 25 and following blocks are as described above, and thus not described here in detail.

In this way, in a case where shutdown may occur for some reason (e.g. emergency stop of the gas engine 1 due to loss of control power or the like) and exhaust purge is not performed on the exhaust channel 16 after the shutdown, fuel gas remaining in the fuel gas supply pipe 89 flows out to and accumulates in the gas engine 1 and the exhaust channel 16. Upon startup, it is possible to prevent abnormal combustion in the exhaust channel 16 by automatically performing exhaust purge that has failed to be performed during the previous shutdown of the gas engine 1. It is also possible to prevent unnecessary operational errors because it is possible to confirm completion of the exhaust purge with the pilot lamp 29 easily, which enables the operator to determine that the control device 2 is operating normally.

In the present embodiment, it is confirmed whether exhaust purge has been performed during the previous shutdown of the gas engine 1 (block S23 in FIG. 4), and exhaust purge is not performed before startup of the gas engine 1 if exhaust purge has been performed. However, exhaust purge before startup may be a requirement. In this case, while the gas engine 1 is halted, leakage may occur from devices for gas-fuel supply and safety. For instance, temporary deformation (elastic deformation) may occur to a seal portion due to an earthquake or the like, and fuel-gas may leak from the deformed part to accumulate in the exhaust channel 16. Furthermore, non-combusted gas may accumulate in the exhaust channel 16 due to a failure in ignition upon startup, for instance. Also in such a case, with the exhaust purge before startup of the gas engine 1 being a requirement, it is possible to improve safety with respect to abnormal combustion in the exhaust channel 16 even further.

Figure 5:
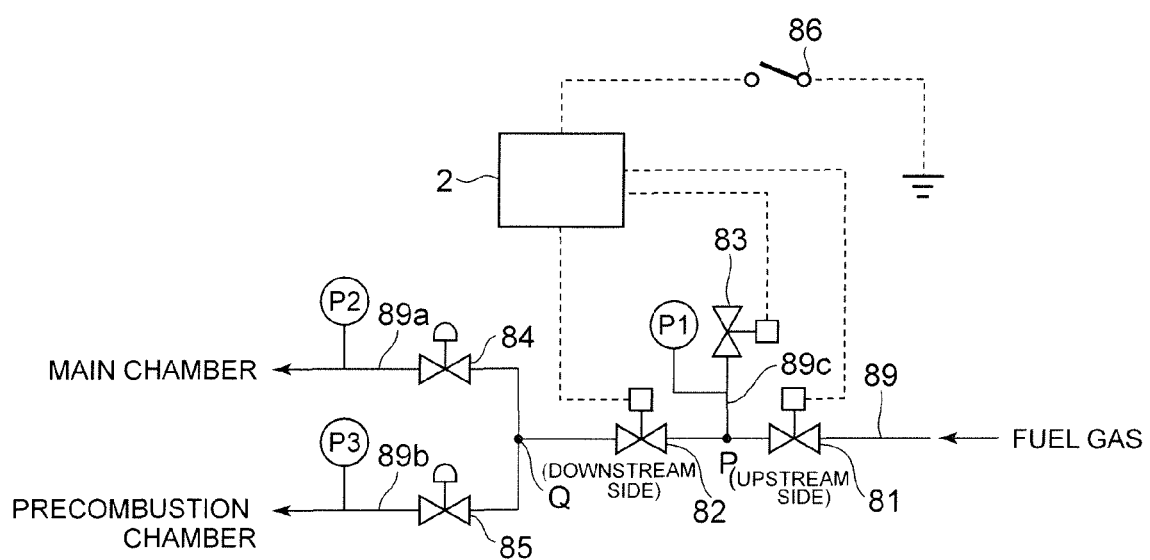
FIG. 5 is a configuration diagram of a fuel-gas leakage detection unit according to an embodiment.

Further, in the present embodiment, before operation of the air starting device 30, a gas-leakage checking device 8 disposed in the fuel-gas supply pipe 89 is manually started. With reference to FIG. 5, the gas-leakage checking device 8 will be described. The gas-leakage checking device 8 includes: the first safety shutoff valve 81; the second safety shutoff valve 82 disposed on the downstream side of the first safety shutoff valve 81; a gas-leakage checking pipe 89c branched from the fuel-gas supply pipe 89 at an intermediate point P between the first safety shutoff valve 81 and the second safety shutoff valve 82; a gas-discharge valve 83 for discharging or shutting off fuel gas between the first safety shutoff valve 81 and the second safety shutoff valve 82, disposed on a distal end portion of the gas-leakage checking pipe 89c; the first pressure meter P1 disposed in the gas-leakage checking pipe 89c between the point P and the gas-discharge valve 83; the main-chamber supply pipe 89a for introducing fuel gas to the main chamber of the combustion chamber at a point Q on the downstream side of the second safety shutoff valve 82; a precombustion-chamber supply pipe 89b for introducing the fuel gas to the precombustion chamber of the combustion chamber; a main pressure-adjustment valve 84 for adjusting the flow rate of the fuel gas to the main chamber, disposed in the main-chamber supply pipe 89a; the second pressure meter P2 disposed on the downstream side of the main pressure-adjustment valve 84; an auxiliary pressure-adjustment valve 85 for adjusting the flow rate of the fuel gas to the precombustion chamber, disposed in the precombustion-chamber supply pipe 89b; the third pressure meter P3 disposed on the downstream side of the auxiliary pressure-adjustment valve 85; the control device 2 which opens and closes each of the first safety shutoff valve 81, the second safety shutoff valve, 82 and the gas-discharge valve 83 in a set order; and a gas-leakage checking S/W 86, which is a starting switch that starts the control device 2. The above are arranged in this order from the upstream side of the fuel-gas supply pipe 89 with respect to the flow direction of the fuel gas.

With reference to FIG. 6, a gas-leakage checking method of the first safety shutoff valve 81, the second safety shutoff valve 82, and the gas-discharge valve 83 constituting the gas-leakage checking device 8 will be described. First, before the starting switch 65 is turned on, the gas-leakage checking S/W (switch) 89 of the gas-leakage checking device 8 is switched on manually. Thus, the gas engine 1 is shut down while the method is performed. The control device 2 operates the gas-discharge valve 83 from an open state to a closed state in the first operation (automatically operated by the control device 2) illustrated in FIG. 6. The gas engine 1 maintains the gas-discharge valve 83 to be open during shutdown so that the fuel gas does not flow into the gas engine 1. Thus, if the gas-discharge valve 83 is operated from the open state to the closed state, the first safety shutoff valve 81 and the second safety shutoff valve 82 are both in a closed state.

Furthermore, the pressure between the first safety shutoff valve 81 and the second safety shutoff valve 82 is the atmospheric pressure. In this state, if the first, second, and third pressure meters P1, P2, P3 all show no change, it means that the fuel gas accumulating on a side of the first safety shutoff valve 81 that is closer to the fuel-gas supply device 17 is not leaking to the downstream side from the first safety shutoff valve 81. Further, also in a case where the second and third pressure meters P2, P3 show no change, whether gas is leaking cannot be determined because fuel-gas pressure is not applied to the second safety shutoff valve 82 and the gas-discharge valve 83. Thus, it is possible to determine that there is no gas leakage in the first safety shutoff valve 81.

If the first pressure meter P1 shows a pressure increase, and the second and third pressure meters P2, P3 show no change, it means that gas is leaking at the first safety shutoff valve 81, and gas is not leaking at the second safety shutoff valve 82. Further, gas leakage of the gas-discharge valve 83 cannot be determined at this point of time because the pressure of the first pressure meter P1 increases if the amount of leakage is small with respect to the amount of gas leakage of the first safety shutoff valve 81. Further, if the pressures of the first, second, and third pressure meters P1, P2, P3 are all increased, gas is leaking at both of the first and second safety shutoff valves 81, 82, and gas leakage cannot be determined for the gas-discharge valve 83 at this point of time. If the amount of leakage of the first safety shutoff valve 81 is larger than the amount of leakage of the gas-discharge valve 83, the pressures of the first, second, and third pressure meters P1, P2, P3 all increase.

In the second operation, the first safety shutoff valve 81 is operated from a closed state to an open state. In this state, the pressure of the fuel gas accumulating on the upstream side of the first safety shutoff valve 81 acts on the second safety shutoff valve 82 and the gas-discharge valve 83. Thus, the fuel-gas pressure at the upstream side of the first pressure meter P1 is applied to the first pressure meter P1, and thus the pressure of the first pressure meter P1 increases. If the second and third pressure meters P2, P3 show no change, the second safety shutoff valve 82 and the gas-discharge valve 83 are determined to be not having gas leakage. In this case, the reading (pressure) of the first pressure meter P1 is a gas supply pressure. If the pressure of the first pressure meter P1 once increases and then decreases while the pressures of the second and third pressure meters P2, P3 increase, it is determined that at least the second safety shutoff valve 82 has gas leakage. Further, if the pressure of the first pressure meter P1 decreases while the pressures of the second and third pressure meters P2, P3 do not change, it is determined that the gas-discharge valve 83 has gas leakage.

In the third operation, the first safety shutoff valve 81 is operated from an open state to a closed state. As a result, fuel gas is trapped between the first and second safety shutoff valves 81, 82 and the gas-discharge valve 83 (the fuel gas pressure is maintained). If there is no change in the first, second, and third pressure meters P1, P2, P3, it is determined that there is no gas leakage in the first and second safety shutoff valves 81, 82 and the gas-discharge valve 83.

Further, if the pressure of the first pressure meter P1 decreases and there is no change in the second and third pressure sensors P2, P3, there is no leakage at the first safety shutoff valve 81, and there is no leakage from the second safety shutoff valve 82 toward the second and third pressure meters P2, P3, and thus it is determined that gas is leaking at the gas-discharge valve 83. Further, if the pressure of the first pressure meter P1 decreases while the pressures of the second and third pressure meters P2, P3 increase, it is determined that the first safety shutoff valve 81 and the gas-discharge valve 83 are shut off (no gas leakage) and the second safety shutoff valve 82 has gas leakage. Assuming that gas is leaking at the gas-discharge valve 83, there is no supply of fuel gas (leakage) from the first safety shutoff valve 81, and thus the fuel gas between the first and second safety shutoff valves 81, 82 and the gas-discharge valve 83 has its pressure reduced and does not flow to the second and third pressure meters P2, P3. Accordingly, it is possible to determine that gas is not leaking at the gas-discharge valve 83.

As described above, pressure meters are provided to check gas leakage according to the above procedure so that double or triple cross check is performed to determine gas leakage of the first and second safety shutoff valves 81, 82 and the gas-discharge valve 83, which makes it possible to prevent in advance unpredictable trouble due to gas leakage.

A time schedule for operation of the slow air turning, the exhaust purge, and the gas-leakage checking device 8 according to the present embodiment will be described with reference to FIG. 7. Firstly, startup preparation of the gas engine 1 is performed. Startup preparation includes, for instance, treatment for warming the gas engine 1 (circulation of warm water, circulation of lubricant oil, or the like), and operation of exhaust purge or the gas-leakage checking device 8 according to an embodiment. In this case, the gas engine 1 does not rotate. The gas-leakage checking device 8 switches on the gas-leakage checking S/W 86. The control device 2 operates the first and second safety shutoff valves 81, 82 and the gas-discharge valve 83 of the gas-leakage checking device 8 on the basis of the above described operation to confirm that there is no gas leakage at the above valves.

Next, the startup starting S/W 65 is switched on (manual manipulation). The control device 2 checks whether exhaust purge has been performed during the previous shutdown of the gas engine 1. If exhaust purge has not been performed, exhaust purge is performed forcedly for a set period of time. In an embodiment, it is checked whether exhaust purge has been operated. However, forced operation of exhaust purge may be automatically performed if the startup starting S/W 65 is switched on (manual manipulation), without performing the check. In this case, even if there is non-combusted gas accumulating in the gas engine 1 and the exhaust channel 16 due to an unpredictable reason such as gas leakage after the gas engine 1 is halted, it is possible to eliminate the non-combusted gas securely.

Once the operation of the exhaust-purge fan 7 is completed, the slow-air-turning main starting valve 31 starts startup, and the gas engine 1 starts rotation at a low speed (slow rotation). The rotation speed is operated for a period of time (the rotation speed is replaced with time) corresponding to an input value of the rotation-speed input SAY, which is the cumulative rotation-speed setting device, in an embodiment, i.e., from a start time T0 to the second elapsed time T2. The main starting valve 61 opens at the first elapsed time T1 slightly before the end of the second elapsed time T2, so that air startup is started. This is to prevent a delay in operation of the compressed air for air startup if the gas engine 1 is switched from slow air turning to air startup, and to increase the rotation speed in the air startup in an early stage.

While the main starting valve 61 is open, the control device 2 concurrently issues an operation command to an ignition device (not illustrated) for causing a spark plug in the combustion chamber to ignite. If the main starting valve 61 opens, rotation of the gas engine 1 increases its speed gradually from the low speed operation, and if "the rotation speed N≥the first set rotation speed Ns" is satisfied, the first and second safety shutoff valves 81, 82 open and supply of the fuel gas is started (the third elapsed time T3). The operation command is issued to the ignition device before the fuel gas is supplied, so that the fuel gas is ignited immediately after being supplied to the combustion chamber, thereby preventing misfire of the fuel gas and occurrence of abnormal combustion. Once the fuel gas is supplied, the rotation speed of the gas engine 1 increases further toward self-sustained operation. If "the rotation speed N≥the second set rotation speed No" is satisfied in the gas engine 1, the main starting valve 61 closes at the fourth elapsed time T4, and the air startup is completed.

As described above, the exhaust-purge fan 7, the gas-leakage checking device 8, and the slow air turning based on the cumulative rotation speed setting of slow air turning corresponding to the capacity of the exhaust channel are performed, so that the gas engine 1 and the exhaust channel 16 are ventilated doubly or triply upon startup of the gas engine 1, which makes it possible to prevent abnormal combustion therein securely.

Figure 8:
FIG. 8 is an operation-time chart of each device upon shutdown of the gas engine according to an embodiment.

The time schedule for operation of each device during shutdown of the gas engine 1 will be described with reference to FIG. 8. Firstly, a shutdown S/W (not illustrated) of the gas engine 1 is operated. A fuel-gas discharge valve (not illustrated) for taking out fuel gas that is being compressed and sent to the main combustion chamber and the precombustion chamber is opened. The fuel-gas discharge valve is operated from the fifth elapsed time T5 to the seventh elapsed time T7 in which the gas engine 1 completes shutdown. The first and second safety shutoff valves 81, 82 close simultaneously if the fuel-gas discharge valve opens (the fifth elapsed time T5) to shut off supply of fuel gas. A halt command is issued to the ignition device at the sixth elapsed time T6 immediately after the operation for shutting down the gas engine 1 (the fifth elapsed time T5). The ignition device halts immediately at the sixth elapsed time T6.

The gas-discharge valve 83 disposed between the first and second safety shutoff valves 81, 82 of the gas-leakage checking device 8 is opened until the next startup of the gas engine 1. Gas leakage may occur in the first and second safety shutoff valves 81, 82 during shutdown of the gas engine 1 due to temporary deformation or slight leakage, for instance, of the safety shutoff valves due to some unpredictable vibration (e.g. an earthquake) or the like. In such a case, accumulation of fuel gas in the gas engine 1 and the exhaust channel 16 is prevented. Once the operation for stopping the gas engine 1 is performed, the control device 2 operates the exhaust purge fan 7 concurrently from the fifth elapsed time T5 to the eighth elapsed time automatically. The operation time of exhaust purge is varied depending on the exhaust-gas processing specification of the plant (the capacity of the exhaust channel).

In this way, it is possible to provide a starting device for a gas internal combustion engine whereby non-combusted gas possibly accumulating in the gas engine 1 and the exhaust channel 16 is discharged upon ignition startup of the gas engine 1 and abnormal combustion is prevented so as to improve safety, breakage prevention, durability and reliability of the gas engine 1.

Embodiments of the invention may be suitably applied to a starting device for a gas internal combustion engine equipped with a slow air turning device that is operated before startup of an internal combustion engine including an air starting device.

The invention claimed is:

1. A starting device of a gas internal combustion engine, the starting device configured to perform slow-air-turning using compressed air to rotate the gas internal combustion engine at a lower speed than operating speed before starting the gas internal combustion engine, the starting device comprising:
   a compressed-air tank for supplying compressed air to the starting device;
   a rotation-speed detection device comprising a rotational sensor configured to detect a rotation speed of the gas internal combustion engine;
   a compressed-air introduction device comprising a starting valve configured to supply the compressed air to cylinders of the gas internal combustion engine by opening and closing according to an order of an ignition timing of the gas internal combustion engine;
   a compressed-air supply device comprising a slow-air turning main starting valve configured to supply the compressed air from the compressed-air tank to the compressed-air introduction device by opening during the performing of the slow air turning; and
   a control device comprising a cumulative rotation-speed setting device configured to set a threshold value of a cumulative rotation speed by a switch, the control device configured to halt supply of the compressed air by the compressed-air supply device via a starting electromagnetic valve, if the gas internal combustion engine reaches a set cumulative rotation speed based, at least in part, on the rotation speed detected by the rotation-speed detection device.

2. The starting device for a gas internal combustion engine according to claim 1, further comprising:
   a main starting valve configured to start opening before the gas internal combustion engine reaches the set cumulative rotation speed and to supply compressed air to the compressed-air introduction device; and
   a shared pipe to be used as a compressed-air pipe on a downstream side of the main starting valve and as a compressed-air pipe on a downstream side of the slow-air turning main starting valve.

3. The starting device for a gas internal combustion engine according to claim 1, further comprising:
   an orifice disposed in an air pipe between the compressed-air supply device and the compressed-air introduction device, the orifice configured to restrict a flow rate of the compressed air introduced into the cylinders.

4. The starting device for a gas internal combustion engine according to claim 1, further comprising:
   a switch valve disposed on a main starting valve, the switch valve configured to receive a signal from the control device to operate the slow-air-turning main starting valve and reduce incidence of the compressed air being discharged to atmosphere from the main starting valve while the slow-air-turning main starting valve is in operation, the compressed air to be supplied by the compressed-air supply device to the compressed-air introduction device from the main starting valve.

5. The starting device for a gas internal combustion engine according to claim 1, further comprising:
   an exhaust purge fan to perform an exhaust purge to discharge remaining exhaust gas in an exhaust gas channel by sending ambient air to the exhaust channel of the gas internal combustion engine,
   wherein the control device is configured to operate the exhaust purge fan for a predetermined time period before performing the slow air turning, if the exhaust purge to be performed responsive to shutdown of the internal combustion engine is not performed.

6. The starting device for a gas internal combustion engine according to claim 1, wherein the control device is configured to operate a gas-leakage checking device to check for leakage of fuel gas before performing slow air turning, and
   wherein the gas-leakage checking device includes at least one pressure meter and is configured to check for leakage of fuel gas according to changes in pressure detected by the pressure meter.

7. The starting device for a gas internal combustion engine according to claim 6,
   wherein the gas-leakage checking device includes:
     a first safety shutoff valve disposed in a fuel-gas supply pipe to supply the fuel gas to a combustion chamber of the gas internal combustion engine;
     a second safety shutoff valve disposed on a downstream side of the first safety shutoff valve;
     a gas-leakage checking pipe branched from the fuel-gas supply pipe between the first safety shutoff valve and the second safety shutoff valve;
     a gas-discharge valve disposed on a distal end portion of the gas-leakage checking pipe and configured to discharge the fuel gas between the first safety shutoff valve and the second safety shutoff valve;
     a first pressure meter disposed in the gas-leakage checking pipe on an upstream side of the gas-discharge valve and configured to detect a fuel-gas pressure in the gas-leakage checking pipe;
     a main-chamber supply pipe comprising a first pipe of branched pipes branched at a downstream side of the second safety shutoff valve and configured to supply the fuel gas to a main chamber of the combustion chamber via the fuel-gas supply pipe;
     a precombustion-chamber supply pipe comprising a second pipe of the branched pipes and configured to supply the fuel gas to a precombustion chamber of the combustion chamber;
     a second pressure meter disposed in the main-chamber supply pipe and configured to detect a pressure of the fuel gas in the main-chamber supply pipe; and
     a third pressure meter disposed in the precombustion-chamber supply pipe and configured to detect a pressure of the fuel gas in the precombustion-chamber supply pipe.

* * * * *